United States Patent
Maeda et al.

(10) Patent No.: US 7,338,985 B2
(45) Date of Patent: Mar. 4, 2008

(54) RUSTPROOFING COMPOSITION

(75) Inventors: Takahide Maeda, Wako (JP); Toshiya Nishino, Wako (JP); Yoichiro Inaba, Wako (JP); Kazuo Igarashi, Wako (JP); Noriharu Tanaka, Tokyo (JP); Kazuhiko Maesori, Tokyo (JP); Takeshi Masuda, Tokyo (JP)

(73) Assignees: Honda Motor Co., Ltd., Tokyo (JP); Parker Industries, Inc., Tokyo (JP)

( * ) Notice: Subject to any disclaimer, the term of this patent is extended or adjusted under 35 U.S.C. 154(b) by 350 days.

(21) Appl. No.: 11/214,015

(22) Filed: Aug. 30, 2005

(65) Prior Publication Data

US 2006/0047038 A1    Mar. 2, 2006

(30) Foreign Application Priority Data

Aug. 31, 2004    (JP)    ............................. 2004-252240

(51) Int. Cl.
*C08F 2/46* (2006.01)
*C08F 2/50* (2006.01)

(52) U.S. Cl. ........................... 522/74; 522/71; 522/79; 522/78; 522/77; 522/76; 522/80; 522/83; 522/90; 522/96; 522/104; 522/107; 522/150; 522/151; 522/152; 522/153; 522/157

(58) Field of Classification Search ................ 522/71, 522/74, 75, 76, 77, 79, 80, 83, 90, 96, 104, 522/107, 150, 152, 151, 153, 154, 157, 173, 522/174, 178

See application file for complete search history.

(56) References Cited

U.S. PATENT DOCUMENTS

| | | | | |
|---|---|---|---|---|
| 3,754,942 A | * | 8/1973 | Moradian | 106/14.27 |
| 4,070,262 A | * | 1/1978 | Guarino et al. | 522/26 |
| 4,071,425 A | * | 1/1978 | Guarino et al. | 522/14 |
| 4,263,062 A | * | 4/1981 | Anzenberger | 148/248 |
| 4,386,173 A | * | 5/1983 | Chang | 523/453 |
| 4,495,225 A | * | 1/1985 | Ciuba et al. | 427/236 |
| 4,650,692 A | * | 3/1987 | Hayner | 427/475 |
| 4,851,043 A | * | 7/1989 | Dotson et al. | 106/14.11 |
| 4,929,171 A | * | 5/1990 | Hayashi et al. | 427/514 |
| 4,990,184 A | * | 2/1991 | Dotson et al. | 106/14.11 |
| 5,002,975 A | * | 3/1991 | Bartoszek-Loza et al. | 522/14 |
| 5,128,391 A | * | 7/1992 | Shustack | 522/92 |
| 5,224,957 A | * | 7/1993 | Gasser et al. | 623/6.61 |
| 5,407,471 A | * | 4/1995 | Rohr et al. | 106/14.44 |
| 5,648,158 A | * | 7/1997 | Pfeffer | 428/325 |
| 5,750,197 A | * | 5/1998 | van Ooij et al. | 427/308 |
| 5,888,281 A | * | 3/1999 | Longo | 106/14.29 |
| 5,976,419 A | * | 11/1999 | Hawkins et al. | 252/512 |
| 6,103,306 A | * | 8/2000 | Miyahara et al. | 427/287 |
| 6,211,262 B1 | * | 4/2001 | Mejiritski et al. | 522/71 |
| 6,312,509 B1 | * | 11/2001 | Moradian | 106/14.35 |
| 6,893,687 B2 | * | 5/2005 | Maurus | 427/508 |

FOREIGN PATENT DOCUMENTS

| | | |
|---|---|---|
| DE | 103 00751 A1 | 7/2004 |
| JP | 60-040159 | 3/1985 |
| JP | 61-055198 | 3/1986 |
| JP | 01-092267 | 4/1989 |
| JP | 2003-268574 | 9/2003 |
| JP | 2004-192873 | 7/2004 |

* cited by examiner

*Primary Examiner*—Sanza L. McClendon
(74) *Attorney, Agent, or Firm*—Arent Fox LLP

(57) ABSTRACT

A rustproofing composition has superior properties satisfying rustproofing quality requirements and workability requirements for car underbodies, parts around tires, parts with pockets, plate-bonded parts or the like of car bodies, and containing volatile organic solvent of 20 mass % or less. In a rustproofing composition containing UV curable resin and photopolymerizing initiator and at least one of rustproofing oil and rustproofing wax, the content of nonvolatile component at 105° C. for 3 hours in the rustproofing oil and rustproofing wax is 80 mass % or more, the UV curable resin and photopolymerizing initiator are dissolved or dispersed in the rustproofing oil and rustproofing wax, and the UV curable resin is contained at 0.3 to 10 weight % to the total weight of the composition.

5 Claims, No Drawings

RUSTPROOFING COMPOSITION

FIELD OF THE INVENTION

The present invention relates to rustproofing compositions which are applied to car underbodies, parts for car bodies, parts with pockets or the like in vehicles, in particular in automobiles, and relates to rustproofing compositions which can be used for long-term rustproofing of common metallic materials.

BACKGROUND ART

As a rustproofing agent for car underbodies, parts around tires, parts with pockets, and plate-bonded parts, rustproofing agents in which wax and several kinds of additives are dissolved or dispersed in organic solvents such as mineral spirits, that is, wax-type rustproofing agents, have been used. Compositions which can be applied thick are also used as long-term rustproofing agents for metallic materials outdoors, since high rustproofing ability is exhibited. In addition, a rustproofing oil which does not contain much wax component or petrolatum component is unsuitable for long-term rustproofing, since it cannot be applied thickly.

As a conventional wax-type rustproofing agent, for example, compositions with improved coating ability are disclosed in Japanese Unexamined Patent Application Publications Nos. S60-40159 and H1-92267, and a composition which improves production technology is disclosed in Japanese Unexamined Patent Application Publication No. S61-55198. However, when these wax-type rustproofing agents are used for rustproofing plate-bonded parts, it is necessary to adjust the viscosity to be low in order to ensure sufficient permeability into narrow gaps, and it is necessary to have a time in which viscosity is increased by evaporation of solvent to some extent in order to prevent running after application. Additionally, in order to improve permeability and spray workability, in these compositions, organic solvents such as mineral spirits are used as solvents for dilution and dispersion so as to adjust viscosity. There are cases in which the content of the organic solvents exceeds 70 weight %. Furthermore, in the case in which the compositions are applied thickly to car underbodies or parts around tires, there is a problem in that the applied agents are not dried easily and are sticky forever. That is, the compositions are applied and the wax coating which is a semi-hard coating is formed by evaporating the organic solvent into the air. Because such evaporated organic solvents are recently considered to be one of the causes of global warming, research to reduce organic solvents which are used in coatings is often performed and movements to regulate the amount of volatile organic solvent by law are increasing. Some rustproofing compositions which satisfy the above demands are proposed in Japanese Unexamined Patent Application Publication No. 2003-268574 and Japanese Patent Application No. 2004-192873.

However, in the case in which organic solvents evaporated from the wax-type rustproofing agents are simply reduced, the viscosity of the agents is increased and sufficient permeation into gaps cannot be obtained. Therefore, in conventional technology, non-volatile component content was limited to 80 weight % in order to maintain sufficient permeation and prevention of running is inferior. Furthermore, as a method to reduce organic solvents evaporated from the wax-type rustproofing agent, a method in which the organic solvent used in the compositions is substituted by high-viscosity oil having low volatility was examined. However, in this method, the coated film did not dry so as to run forever, the coated film flowed off under high temperatures or vibrations, the coated film was easily removed by a physical force such as contact with water or the like, and sufficient rustproofing ability could not be obtained.

In addition, as a method to reduce organic solvent, a method in which water-based rustproofing component is used was suggested. However, when the water-based rustproofing agents were applied to pockets in parts of car bodies or plate-bonded parts, water which was contained in the permeated compositions could not be evaporated and rust was generated. Furthermore, a rust preventing method in which a wax composition in a solid state at normal temperatures is heated to melt and is coated by dipping these parts into the melted wax, or a rust preventing method in which melted wax is used, was developed. However, such methods require large-scale equipment, and large amounts of heat are required to melt the solid wax, and these methods therefore have problems in cost efficiency.

SUMMARY OF THE INVENTION

An object of the present invention is to provide a rustproofing composition which can provide required rustproofing quality and workability for car underbodies, parts around tires, parts with pockets, plate-bonded parts or the like of car bodies, and which is environmentally friendly, containing volatile organic solvent of not more than 20 mass %. Specifically, an object is to provide a rustproofing composition which has superior permeability and can prevent in a short time running after application when its viscosity is low, and which can coat thickly and can form a dry soft coating without stickiness in a short time when its viscosity is high.

The inventors noted that UV curable resin to which a photopolymerizing initiator is added is hardened in a short time by irradiation with UV rays, and they succeeded in development of a rustproofing composition in which volatile organic solvent can be reduced by adding the UV curable resin and the photopolymerizing initiator to rustproofing oil and rustproofing wax, and in which a dry coating without running can be formed in a short time by irradiation with UV rays.

Therefore, the rustproofing composition of the present invention containing UV curable resin and photopolymerizing initiator, and at least one of rustproofing oil and rustproofing wax, wherein content of nonvolatile component at 105° C. for 3 hours in the rustproofing oil and rustproofing wax is 80 mass % or more, the UV curable resin and photopolymerizing initiator are dissolved or dispersed in the rustproofing oil and rustproofing wax, and the UV curable resin is contained at 0.3 to 10 weight % to the total weight of the composition.

In addition, in the rustproofing composition of the present invention, it is preferable that the content of the nonvolatile component at 105° C. for 3 hours be 90 mass % or more. Furthermore, the content of solvent having a boiling point of 200° C. or less which is a volatile component is preferably 10 mass % or less and more preferably 1 mass % or less.

According to the present invention, long-term rustproofing effects can be obtained which are similar to those of rustproofing wax which contains conventional organic solvents, and moreover, the same method as for the conventional waxes can be used. Furthermore, since a UV ray irradiation reaction is used in the rustproofing composition of the present invention, in the case in which the rustproofing composition is coated on car underbodies, a dry coating is obtained in a short time by irradiation with UV rays, and as a result, the work environment can be improved by preventing the rustproofing composition from running. In addition, in the case in which the rustproofing composition is coated on plate-bonded parts such as parts with pockets or the like, the work environment can be improved by irradiation with UV rays on the composition which overflowed and ran after sufficiently permeating between the parts, and on the other hand, since UV rays were not irradiated inside, the rustproofing composition is not dried forever, and as a result, it efficiently conforms to the deformations of car bodies during running. Therefore, long-term rustproofing effects can be expected.

Furthermore, since volatile organic solvent content is low, in comparison with conventional solvent containing type rustproofing waxes which cannot expand use by solvent regulation, etc., the rustproofing composition of the present invention can sufficiently satisfy requirements for rustproofing in automobiles which has become recently more stringent, and in addition, is very cost effective. Additionally, according to the present invention, viscosity is increased by irradiating UV rays so as to maintain coating thickness, even if rustproofing oils containing little wax component and petrolatum component which cannot be coated thickly by conventional technique are used.

BEST MODE FOR CARRYING OUT THE INVENTION

Next, the rustproofing composition of the present invention is further explained in detail.

As a UV curable resin in the present invention, photopolymerizable oligomers such as urethane acrylate, polyester acrylate, and epoxy acrylate, and photopolymerizable monomers such as acrylate monomer, vinyl monomers, etc., can be used. Of these, it is preferable that UV curable resin having superior compatibility with the composition be used alone or in combination, and in addition, it is more preferable that the mixing amount of acrylate monomer be higher. Furthermore, it is most preferable that the acrylate monomer be an ethylene oxide adduct of trimethylolpropane triacrylate.

In the present invention, it is necessary that the mixing amount of UV curable resin be 0.3 to 10 weight % to total composition, and it is preferable that the mixing amount be 1 to 2 weight %. When the mixing amount is not more than 0.3 weight %, the film of the rustproofing composition will not be sufficiently hardened. In contrast, when the mixing amount exceeds 10 weight %, superior corrosion resistance is not obtained since the rustproofing composition after irradiation with UV rays is too hard, and in addition, the rustproofing composition becomes expensive and economic utility value decreases.

As a photoinitiator in the present invention, photoinitiators having superior compatibility with the composition of cleavage reaction type initiators, hydrogen abstraction type initiators, and other well-known various conventional photoinitiators, can be used. Specifically, cleavage reaction type of 1-hydroxy-2-methyl-1-phenyl-1-one can be used. In addition, in the present invention, it is necessary that the mixing amount of the photoinitiator be an amount which can sufficiently harden a UV curable resin and it is preferable that the mixing amount be a minimum amount which can sufficiently harden a UV curable resin depending on kind or amount of the UV curable resin.

It is necessary that nonvolatile component content at 105° C. for 3 hours in rustproofing oil and rustproofing wax in the present invention be 80 mass % or more, and it is preferable that the nonvolatile component content at 105° C. for 3 hours be 90 mass % or more. Additionally, it is preferable that the content of solvent having a boiling point of 200° C. or less which is a volatile component be 10 mass % or less, and it is more preferable that it be 1 mass % or less.

As a rustproofing oil in the present invention, lubricating oil type rustproofing oils in Japanese Industrial Standard K 2246, etc., can be used. In addition, the rustproofing wax in the present invention is a composition which dissolves or disperses wax with various additives in solvent, and as a rustproofing wax, general well-known waxes which change solvent into a solution having low content of volatile component, can be used. In the present invention, of these rustproofing waxes, rustproofing waxes including at least one kind of heat-polymerized drying oil selected from polymerized oils in which oil having an iodine value of 130 or more is heat-polymerized at 5 to 60 weight % to the total weight of the composition; and at least one of a wax selected from natural waxes and synthetic waxes and at least a rustproofing additive selected from sulfonates, carboxylic acid salts, fatty acid esters, amine salts, oxide paraffin salts, and oxide wax salts for 1 to 50 weight % of the entirety of the composition; in which the heat-polymerized drying oil, the wax, and the rustproofing additive are dissolved or dispersed in at least one kind of solvent selected from mineral oil type lubricant based oils, synthetic lubricant oil base materials, liquid saturated hydrocarbon mixtures, vegetable oil based semidrying oils, and vegetable oil based nondrying oils, are preferable.

In the rustproofing wax in the present invention, mixing amount of the heat-polymerized drying oil to total composition is preferably 5 to 60 weight %, and is more preferably 10 to 20 weight %. When the mixing amount is not more than 5 weight %, sufficient drying property of the rustproofing composition coating cannot be obtained, and as a result, it forms undesirable insufficiently dried coatings. In contrast, when the mixing amount exceeds 60 weight %, viscosity of the rustproofing composition is too high, deteriorating workability, and it is difficult to perform coating uniformly.

Specifically, as a polymerized oil which heat-polymerizes oils having an iodine value not less than 130, heat polymerized oils of linseed oil, perilla oil, tung oil, hempseed oil, safflower oil, oiticica oil, sardine oil, herring oil, dehydrated castor oil in which castor oil is dehydrated to produce conjugated acid, synthetic drying oil, or the like can be used. As a natural wax, vegetable oil based waxes such as candelilla wax, carnauba wax, rice wax, haze wax, jojoba wax or the like; animal oil based waxes such as beeswax, lanolin wax, spermaceti wax (Spermaceti wax is a wax obtained from the head cavity of the sperm whale. After the death of the sperm whale, part of the oil in the cavity is solidified, and the oil is filtered to obtain a crude wax. This crude wax is purified by treating with sodium hydroxide and potassium carbonate.) or the like; mineral oil based waxes such as montan wax, ozokerite (Ozokerite is a wax containing straight-chain, side-chain, and cyclic hydrocarbon having molecular weight of $C_{29}H_{60}$ to $C_{53}H_{108}$. Ozokerite is solid at room temperature, and has superior holding property to oil, grease, and some kinds of solvent.), ceresin wax or the like; petroleum wax such as paraffin wax, microcrystallin wax, petrolatum or the like, can all be used. In addition, as a synthetic wax, synthetic hydrocarbons such as Fischer-Tropsch wax, polyethylene wax or the like; denatured wax such as montan wax derivatives, paraffin wax derivatives; microcrystallin waxes derivatives or the like; hydrogenated waxes such as hardened castor oil, hardened castor oil derivatives or the like; fatty acids such as 12-hydroxy stearic acid or the like; acid amides such as stearic acid amide or the like; esters such as phthalic anhydride imide or the like; or chlorohydrocarbon, or mixed waxes in which these waxes are mixed, can be used.

These waxes can be used singly or in mixed condition. The melting point of the waxes is preferably in a range of 60 to 130° C., and more preferably in a range of 80 to 100° C. In the case in which the melting point is less than 60° C., running occurs under high temperatures in summer before drying if the wax is coated inside a car body. On the other hand, in the case in which the melting point is more than 130° C., production processes of the composition require high temperatures and it becomes difficult to use it in practice. Specifically, it is desirable that paraffin wax, microcrystallin wax, petrolatum, polyethylene wax and each kind of denatured wax be used singly or in mixed condition. Furthermore, it is desirable that microcrystallin wax be used singly or in mixed condition.

In addition, in the rustproofing wax in the present invention, rustproofing additives selected from sulfonates, carboxylic acid salts, fatty acid esters, amine salts, oxide paraffin salts, and oxide wax salts can be used with the above waxes. Although there are rustproofing additives which are diluted by organic solvent beforehand, rustproofing additives having low content of volatile components are desirable for use in the present invention. Specifically, oil-reduced sulfonate, fatty acid esters, and oxide paraffin salts are desirable. It is more desirable that oil reduced calcium sulfonate salt and fatty acid esters be used alone or in mixtures.

In the rustproofing wax in the present invention, a coated film can be made water-repellant by adding waxes or rustproofing additives. At the same time, efficient corrosion resistance can be obtained by forming precise continuous coated films. Furthermore, it is possible to control viscosity by using crystallization of wax. The contained amount of waxes and rustproofing additives in the rustproofing wax in the present invention is in a range of 1 to 50 weight % of the overall composition, and is desirably in a range of 10 to 30 weight %. It is desirable that the contained amount of a material having high crystallinity be relatively low. On the other hand, it is desirable that the contained amount of material having low crystallinity be relatively high. If the contained amount is less than 1 weight %, sufficient corrosion resistance cannot be obtained. On the other hand, if the contained amount is more than 50 weight %, the viscosity becomes too high, reduceing workability, and it becomes difficult to coat uniformly.

In the rustproofing wax in the present invention, solvent is added to control viscosity desirably by dissolving or dispersing each component, and it can be selected from mineral oil type lubricant based oils, synthetic lubricant based agents, liquid saturated hydrocarbon mixtures, vegetable oil based semidrying oils, or vegetable oil based nondrying oils. Specifically, paraffin type lubricant based oil, naphthene type lubricant based oil or the like as the mineral oil type lubricant based oil, ester based, poly-α-olefin based, polyalkyleneglycol based, polybutene based, alkyldiphenylether based or the like as the synthetic lubricant based oil, liquid paraffin or the like as the liquid saturated hydrocarbon mixture, soybean oil, cottonseed oil, rapeseed oil, rice oil, sesame oil, sunflower oil, corn oil or the like as the vegetable oil based semidrying oil, or olive oil, arachis oil, tsubaki oil or the like as vegetable oil based nondrying oil can be used alone or in mixed condition.

Because solvents such as vegetable oil based semidrying oils and vegetable based nondrying oils include many double bonds in their molecules, from the viewpoint of long-term stability, mineral oil type lubricant based oils, synthetic lubricant based oils, or liquid saturated-hydrocarbon mixtures are desirable. Furthermore, in the present invention, oils having low volatility are desirable. Specifically, it is desirable that the volatilized amount at 105° C. over 3 hours be not more than 5 mass %, and more desirably not more than 1 mass %.

Furthermore, in the rustproofing wax in the present invention, the hardness of the coating film can be controlled within a range which satisfies required quality, and pigments or fillers can be added to give thixotropy to improve running properties. As the added pigment, red iron oxide, zinc powder, zinc phosphate or the like, and other various conventional kinds of pigments can be used. As the added filler, kinds of calcium carbonate, kinds of kaolin clay, kinds of talc, kinds of mica, kinds of bentonite, or other conventional extender pigments can be used. Furthermore, coloring pigments such as carbonblack or titanium oxide can be added to perform coloring.

In the rustproofing wax in the present invention, hardening accelerator can be added to improve or to control drying rate, and anti-skin-forming agents can be added to prevent surface hardening. As the hardening accelerator, cobalt naphthenate, manganese naphthenate, or other conventional additives can be used. As the anti-skin-forming agent, butylated hydroxytoluene or other conventional kinds of additives can be used. In the rustproofing wax in the present invention, deodorizer and adsorbent can be added to reduce and restrain odor which is generated during the hardening reaction by the oxidizing polymerization. As the deodorizer and the adsorbent, thymol or an enzyme compound or other known conventional additives can be mentioned.

The rustproofing composition of the present invention is coated on car underbodies, parts around tires, parts with pockets, and plate-bonded parts of car bodies, by spray coating such as airless spraying or air spraying with conventional spray machines, by flow coating under a shower, or by direct coating with a brush or the like, and then superior rustproofing skins can be formed by irradiation with UV rays. UV rays can be irradiated on the rustproofing composition of the present invention by using a high pressure mercury lamp. Specifically, a commonly available black light of wavelength 254 nm and 365 nm can be used. With respect to irradiation power, exposure time, and irradiation distance, the most efficient condition is preferably selected depending on application. In addition, other well-known black lights can also be used.

EXAMPLES

Next, the present invention is explained in detail by way of Examples and Comparative Examples. It should be noted that the present invention is not particularly limited to Examples described below.

1. Preparation of Rustproofing Composition

Example 1

Raw materials were mixed as shown in Table 1, and the mixture was heated to melting. Next, the mixture was agitated sufficiently by an agitator and was cooled to prepare the rustproofing composition of Example 1 of the present invention. In Tables 1 and 2, the monomer of the UV curable resin is a commercial ethylene oxide adduct of trimethylolpropane triacrylate, the oligomer is a commercial urethane acrylate resin, rustproofing oil 1 is NOX-RUST 550HN (trade name) produced by PARKER INDUSTRIES, INC., rustproofing wax 1 is a wax in which the solvent was replaced with lubricating oil in NOX-RUST HS-700 (trade name) produced by PARKER INDUSTRIES, INC., rustproofing 2 is a mixture of 10 weight % of polymerized dehydrated castor oil, 10 weight % of microcrystallin wax, 10 weight % of sulfonic calcium, 62.9 weight % of liquid paraffin, 5 weight % of calcium carbonate, 1 weight % of bentonite, 0.1 weight % of naphthenic cobalt, and 1 weight % of thymol.

Examples 2 to 14 and Comparative Example 1 to 9

In the same manner as in Example 1, except that each contained amount of raw material was changed to an amount shown in Tables 1 and 2, rustproofing compositions of Examples 2 to 14 and Comparative Examples 1 to 9 of the present invention were prepared.

length 70 mm, width 150 mm, thickness 0.8 mm, was removed by solvent and dried. The rustproofing compositions of the Examples and Comparative Examples were coated on the surface of the steel plate to have a thickness of 30 μm by using a barcoater and immediately by irradiation with UV rays of wavelength 365 nm at 380 mj/cm² using a high pressure mercury lamp of power 80 W, were dried for 1 week at normal temperature, and a salt spray test was performed for 360 hours. Observing the appearance of each steel plate, the time required for the occurrence of rust was measured. The rustproofing ability was evaluated. In the evaluation, ⊚: a rusting occurrence time is more than 240 hours, ◯: it is 120 to 240 hours, Δ: it is 48 to 119 hours, and X: it is less than 48 hours.

(2) Condition of Coated Film After Drying

The oil on a surface of a cold rolled steel plate (Japanese Industrial Standard G3141SPCC-SD) having dimensions of length 70 mm, width 150 mm, and thickness 0.8 mm was

TABLE 1

| | | E 1 | E 2 | E 3 | E 4 | E 5 | E 6 | E 7 | E 8 | E 9 | E 10 | E 11 | E 12 | E 13 | E 14 |
|---|---|---|---|---|---|---|---|---|---|---|---|---|---|---|---|
| UV curable resin | Monomer | 0.3 | 0.3 | 0.3 | | 1.0 | 1.0 | 1.0 | 1.0 | | 10.0 | 10.0 | 10.0 | 10.0 | |
| | Oligomer | | | | 0.3 | | | | | 1.0 | | | | | 10.0 |
| Photopolymerizing initiator | Radical type liquid | 0.2 | 0.2 | 0.2 | 0.2 | 0.5 | 0.5 | 0.5 | | 0.5 | 1.0 | 1.0 | 1.0 | | 1.0 |
| | Radical type powder | | | | | | | | 0.5 | | | | | 1.0 | |
| Rustproofing oil 1 | | 99.5 | | | | 98.5 | | | | | 89.0 | | | | |
| Rustproofing wax 1 | | | 99.5 | | | | 98.5 | | | | | 89.0 | | | |
| Rustproofing wax 2 | | | | 99.5 | 99.5 | | | 98.5 | 98.5 | 98.5 | | | 89.0 | 89.0 | 89.0 |

TABLE 2

| | | CE 1 | CE 2 | CE 3 | CE 4 | CE 5 | CE 6 | CE 7 | CE 8 | CE 9 |
|---|---|---|---|---|---|---|---|---|---|---|
| UV curable resin | Monomer | 0.2 | 0.2 | 0.2 | | 15.0 | 15.0 | 15.0 | 15.0 | |
| | Oligomer | | | | 0.2 | | | | | 15.0 |
| Photopolymerizing initiator | Radical type liquid | 0.2 | 0.2 | 0.2 | 0.2 | 0.5 | 0.5 | 0.5 | | 0.5 |
| | Radical type powder | | | | | | | | 0.5 | |
| Rustproofing oil 1 | | 99.6 | | | | 84.5 | | | | |
| Rustproofing wax 1 | | | 99.6 | | | | 84.5 | | | |
| Rustproofing wax 2 | | | | 99.6 | 99.6 | | | 84.5 | 84.5 | 84.5 |

Comparative Examples 10 to 12

A conventional rustproofing composition (trade name: NOX-RUST HS-700, produced by PARKER INDUSTRIES, INC.) was used as a rustproofing composition of Comparative Example 10. Furthermore, a conventional high-solid rustproofing wax (trade name: NOX-RUST 117, produced by PARKER INDUSTRIES, INC.) was used as a rustproofing composition of Comparative Example 11. Furthermore, the solvent of NOX-RUST HS-700 of Comparative Example 10 was replaced with a lubricant oil to prepare a rustproofing composition of Comparative Example 12.

2. Evaluation Tests

Each of the Examples and Comparative Examples prepared in the manner described above were examined as explained below, and the properties were evaluated. The results are shown in Tables 3 and 4.

(1) Rustproofing Ability (Salt Spray Test)

The oil on a surface of a cold rolled steel plate (Japanese Industrial Standard G3141SPCC-SD) having dimensions of removed by solvent and dried. The rustproofing compositions of the Examples and Comparative Examples were coated on the surface of the steel plate to have a thickness of 30 μm by using a barcoater and immediately by irradiation with UV rays of wavelength 365 nm at 380 mj/cm² using a high pressure mercury lamp of power 80 W, and were dried for 1 day at normal temperature, and they were evaluated for hardness of the coated film and stickiness of the coated film by touching with a finger. In the evaluation of stickiness, ◯: the coated film is not sticky, Δ: it is slightly sticky, and X: it is very sticky and sticks to the finger. Furthermore, in the evaluation of hardness, ◯: the coating film is soft and has sufficient flexibility, and X: the coating film is too hard or too soft.

(3) Flowability

The oil on a surface of a cold rolled steel plate (Japanese Industrial Standard G3141SPCC-SD) having dimensions of length 70 mm, width 150 mm, and thickness 0.8 mm was removed by solvent and dried. The steel plate was set horizontally, and 0.2 ml of the rustproofing compositions of the Examples and Comparative Examples were dropped to the surface of the steel plate using a syringe and immediately by irradiation with UV rays of wavelength 365 nm at 380 mj/cm² using a high pressure mercury lamp of a power of 80 W. The steel plate was set immediately at an angle of 60 degrees and flowability was evaluated by measuring running length of the composition. In the evaluation, ○: the composition did not run, △: running length of the composition was 10 mm or less, and X: running length of the composition was 11 mm or more.

(4) Film Thickness Maintainability

The oil on a surface of a cold rolled steel plate (Japanese Industrial Standard G3141SPCC-SD) having dimensions of length 70 mm, width 150 mm, and thickness 0.8 mm was removed by solvent and the surface was dried. The rustproofing compositions of the Examples and Comparative Examples were coated on the surface of the steel plate to have a thickness of 200 μm by using a barcoater and dried immediately by irradiation with UV rays of wavelength 365 nm at 380 mj/cm² using a high pressure mercury lamp of power 80 W. The steel plate was set vertically for 1 hour and film thickness maintainability was evaluated by measuring thickness of the coating film. In the evaluation, ○: the composition did not run and thickness of the coating film was 180 μm or more, and X: the composition ran and thickness of the coating film was less than 180 μm.

(5) Nonvolatile Component Content

By applying a testing method of nonvolatile component content in the testing method of coating content Japanese Industrial Standard K5407-4, nonvolatile component content in the Examples and Comparative Examples were measured and were evaluated. In the evaluation, ○: nonvolatile component content was 95% or more, △: it was 80% or more, and X: it was 79% or less.

TABLE 3

|  | E 1 | E 2 | E 3 | E 4 | E 5 | E 6 | E 7 | E 8 | E 9 | E 10 | E 11 | E 12 | E 13 | E 14 |
| --- | --- | --- | --- | --- | --- | --- | --- | --- | --- | --- | --- | --- | --- | --- |
| Rustproofing Ability (Salt Spray Test) | ○ | ◎ | ◎ | ◎ | ○ | ◎ | ◎ | ◎ | ◎ | ◎ | ○ | ◎ | ◎ | ◎ |
| Condition of Coated Film after Drying: Stickiness | △ | △ | △ | △ | ○ | ○ | ○ | ○ | ○ | ○ | ○ | ○ | ○ | ○ |
| Condition of Coated Film after Drying: Hardness | ○ | ○ | ○ | ○ | ○ | ○ | ○ | ○ | ○ | ○ | ○ | ○ | ○ | ○ |
| Flowability | △ | △ | △ | △ | ○ | ○ | ○ | ○ | ○ | ○ | ○ | ○ | ○ | ○ |
| Film Thickness Maintainability | △ | ○ | ○ | ○ | ○ | ○ | ○ | ○ | ○ | ○ | ○ | ○ | ○ | ○ |
| Nonvolatile Component Content | △ | △ | ○ | ○ | △ | △ | ○ | ○ | ○ | △ | △ | ○ | ○ | ○ |

TABLE 4

|  | CE 1 | CE 2 | CE 3 | CE 4 | CE 5 | CE 6 | CE 7 | CE 8 | CE 9 | CE 10 | CE 11 | CE 12 |
| --- | --- | --- | --- | --- | --- | --- | --- | --- | --- | --- | --- | --- |
| Rustproofing Ability (Salt Spray Test) | X | ◎ | ◎ | ◎ | X | X | X | X | X | ◎ | ◎ | ○ |
| Condition of Coated Film after Drying: Stickiness | X | X | X | X | ○ | ○ | ○ | ○ | ○ | ○ | ○ | X |
| Condition of Coated Film after Drying: Hardness | X | X | ○ | ○ | X | X | X | X | X | ○ | ○ | X |
| Fluidity | X | X | X | X | ○ | ○ | ○ | ○ | ○ | X | X | X |
| Film Thickness Maintainability | X | X | X | X | ○ | ○ | ○ | ○ | ○ | ○ | ○ | X |
| Nonvolatile Component Content | △ | △ | ○ | ○ | △ | △ | ○ | ○ | ○ | X | X | △ |

As shown in Tables 3 and 4, the rustproofing compositions of Examples 1 to 14 of the present invention exhibit superior characteristics in every tested point, and there is no problem in practical use. In particular, among these, the rustproofing compositions of Examples 7 to 9 were evaluated as not less than ○ in every tested point, and it is clear that these compositions are extremely superior as rustproofing wax compositions which have less impact on the environment. In contrast, Comparative Examples 1 to 4 in which the contained amount of UV curable resin is too low and Comparative Example 12 in which UV curable resin is not contained, stickiness of coating after drying, fluidity, and film thickness maintainability are inferior. On the other hand, Comparative Examples 5 to 9 in which the contained amount of UV curable resin is too high, have problems in the tested points of rustproofing ability and coating hardness after drying.

Furthermore, the rustproofing composition of the present invention can exhibit long-term rustproofing ability which is similar to that of Comparative Examples 10 and 11 which are rustproofing waxes containing conventional organic solvents, and that, in spite of the rustproof composition of the present invention being able to be used in the same method as in a conventional one, the volatile organic solvent content is low. Therefore, it is obvious that the invention is an efficient rustproofing composition which has less impact on the environment and which can have superior effects with respect to global warming. In addition, in the present invention, rustproofing compositions having desirable characteristics can be prepared by changing the contained amount of UV curable resin.

What is claimed is:

1. A rustproofing composition comprising UV curable resin and photopolymerizing initiator and at least one of rustproofing oil and rustproofing wax,
    wherein the content of nonvolatile component at 105° C. for 3 hours in the rustproofing oil and rustproofing wax is 80 mass % or more,
    the UV curable resin and photopolymerizing initiator are dissolved or dispersed in the rustproofing oil and rustproofing wax, and
    the UV curable resin is contained at 0.3 to 10 weight % to the total weight of the composition.

2. The rustproofing composition according to claim 1, wherein the content of nonvolatile component at 105° C. for 3 hours is 90 mass % or more.

3. The rustproofing composition according to claim 1, wherein the content of solvent having a boiling point of 200° C. or less which is a volatile component is 10 mass % or less.

4. The rustproofing composition according to claim 1, wherein the content of solvent a having boiling point of 200° C. or less which is a volatile component is 1 mass % or less.

5. The rustproofing composition according to claim 1, wherein the rustproofing wax comprising:
    at least one kind of heat-polymerized drying oil selected from polymerized oils in which oil having an iodine value of 130 or more is heat-polymerized at 5 to 60 weight % to the total weight of the composition; and
    at least one of a wax selected from natural waxes and synthetic waxes and at least a rustproofing additive selected from sulfonates, carboxylic acid salts, fatty acid esters, amine salts, oxide paraffin salts, and oxide wax salts of 1 to 50 weight % to total composition;
    wherein the heat-polymerized drying oil, the wax, and the rustproofing additive are dissolved or dispersed in at least one kind of solvent selected from mineral oil type lubricant based oils, synthetic lubricant oil base materials, liquid saturated hydrocarbon mixtures, vegetable oil based semidrying oils, and vegetable oil based nondrying oils.

* * * * *